United States Patent
Bafna et al.

(10) Patent No.: US 12,405,918 B2
(45) Date of Patent: Sep. 2, 2025

(54) UTILIZING A MACHINE LEARNING MODEL TO MIGRATE A SYSTEM TO A CLOUD COMPUTING ENVIRONMENT

(71) Applicant: Accenture Global Solutions Limited, Dublin (IE)

(72) Inventors: Amar Ratanlal Bafna, Palghar (IN); Susan Patricia McNamara, Lamberhurst (GB); Parag Rane, Thane West (IN); Ankit Laxmichand Dedhia, Mumbai (IN); Harsh Dhiraj Vira, Mumbai (IN); Mayank Sudhir Singh, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 105 days.

(21) Appl. No.: 17/880,211

(22) Filed: Aug. 3, 2022

(65) Prior Publication Data

US 2024/0045831 A1    Feb. 8, 2024

(51) Int. Cl.
*G06F 16/11* (2019.01)
*G06N 20/00* (2019.01)

(52) U.S. Cl.
CPC ........... *G06F 16/119* (2019.01); *G06N 20/00* (2019.01)

(58) Field of Classification Search
CPC .............................. G06F 16/119; G06N 20/00
See application file for complete search history.

(56) References Cited

U.S. PATENT DOCUMENTS

| | | | | |
|---|---|---|---|---|
| 11,138,049 | B1* | 10/2021 | Featonby | G06F 11/3447 |
| 2021/0409524 | A1* | 12/2021 | Uscumlic | G06N 7/01 |
| 2022/0156162 | A1* | 5/2022 | Reyes | G06F 11/3006 |
| 2022/0156658 | A1* | 5/2022 | Mohan | H04L 41/0654 |
| 2022/0171991 | A1* | 6/2022 | Das | G06N 20/00 |
| 2022/0197306 | A1* | 6/2022 | Cella | G05B 19/41865 |
| 2022/0229682 | A1* | 7/2022 | Gopalan | G06F 9/541 |

\* cited by examiner

*Primary Examiner* — Ann J Lo
*Assistant Examiner* — Fernando M Mari Valcarcel
(74) *Attorney, Agent, or Firm* — POLSINELLI PC

(57) ABSTRACT

A device may receive logs and files associated with a system to be migrated to a cloud computing environment, and may determine workload data of the system. The device may derive a data lineage for source data and target data, and may assess a utilization pattern of the system. The device may process the workload data, the data lineage, and data identifying utilization of a distributed computing feature of the system, with a model, to label utilization features and to recommend a cloud architecture. The device may process the workload data, the data lineage, and the data identifying utilization, with a natural language processing model, to determine a cost of migrating the system. The device may process the labelled utilization features, the cloud architecture, and the cost, with a Q-matrix model, to determine migration actions for migrating the system, and may perform actions based on the migration actions.

17 Claims, 12 Drawing Sheets

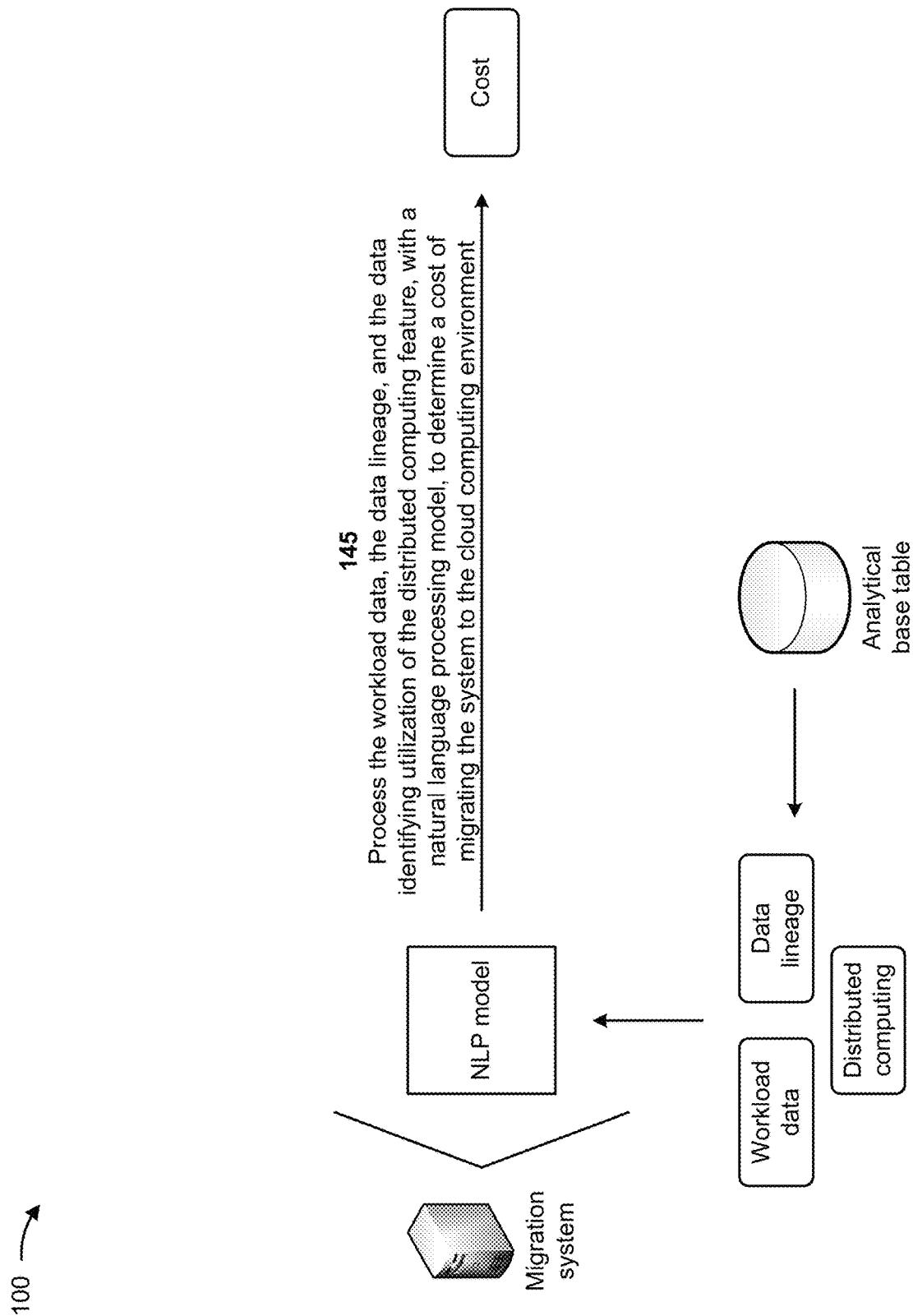

UTILIZING A MACHINE LEARNING MODEL TO MIGRATE A SYSTEM TO A CLOUD COMPUTING ENVIRONMENT

BACKGROUND

A system, such as a legacy statistical analysis system (SAS), may operate more efficiently in a cloud computing environment, may be terminated due to being obsolete, and/or the like.

SUMMARY

Some implementations described herein relate to a method. The method may include receiving logs and files associated with a system to be migrated to a cloud computing environment, and determining, based on the logs and the files, workload data identifying workload patterns of the system. The method may include deriving a data lineage for source data and target data included the logs and the files, and assessing a utilization pattern of the system based on the logs and the files to determine whether a distributed computing feature of the system is being utilized. The method may include processing the workload data, the data lineage, and data identifying utilization of the distributed computing feature, with a machine learning model, to label utilization features of the system and to recommend a cloud architecture. The method may include processing the workload data, the data lineage, and the data identifying utilization of the distributed computing feature, with a natural language processing model, to determine a cost of migrating the system to the cloud computing environment. The method may include processing the labelled utilization features, the cloud architecture, and the cost, with a Q-matrix model, to determine migration actions for migrating the system to the cloud computing environment, and performing one or more actions based on the migration actions.

Some implementations described herein relate to a device. The device may include one or more memories and one or more processors coupled to the one or more memories. The one or more processors may be configured to receive logs and files associated with a system to be migrated to a cloud computing environment, and determine, based on the logs and the files, workload data identifying workload patterns of the system. The one or more processors may be configured to derive a data lineage for source data and target data included the logs and the files, and assess a utilization pattern of the system based on the logs and the files to determine whether a distributed computing feature of the system is being utilized. The one or more processors may be configured to train a machine learning model with a training dataset to generate a trained machine learning model, and process the workload data, the data lineage, and data identifying utilization of the distributed computing feature, with the trained machine learning model, to label utilization features of the system and to recommend a cloud architecture. The one or more processors may be configured to process the workload data, the data lineage, and the data identifying utilization of the distributed computing feature, with a natural language processing model, to determine a cost of migrating the system to the cloud computing environment. The one or more processors may be configured to process the labelled utilization features, the cloud architecture, and the cost, with a Q-matrix model, to determine migration actions for migrating the system to the cloud computing environment, and perform one or more actions based on the migration actions.

Some implementations described herein relate to a non-transitory computer-readable medium that stores a set of instructions for a device. The set of instructions, when executed by one or more processors of the device, may cause the device to determine, based on logs and files associated with a system to be migrated to a cloud computing environment, workload data identifying workload patterns of the system, and derive a data lineage for source data and target data included the logs and the files. The set of instructions, when executed by one or more processors of the device, may cause the device to assess a utilization pattern of the system based on the logs and the files to determine whether a distributed computing feature of the system is being utilized, and process the workload data, the data lineage, and data identifying utilization of the distributed computing feature, with a machine learning model, to label utilization features of the system and to recommend a cloud architecture. The set of instructions, when executed by one or more processors of the device, may cause the device to process the workload data, the data lineage, and the data identifying utilization of the distributed computing feature, with a natural language processing model, to determine a cost of migrating the system to the cloud computing environment. The set of instructions, when executed by one or more processors of the device, may cause the device to process the labelled utilization features, the cloud architecture, and the cost, with a Q-matrix model, to determine migration actions for migrating the system to the cloud computing environment, and perform one or more actions based on the migration actions.

BRIEF DESCRIPTION OF THE DRAWINGS

FIGS. 1A-1H are diagrams of an example implementation described herein.

DETAILED DESCRIPTION

Figure 1A:
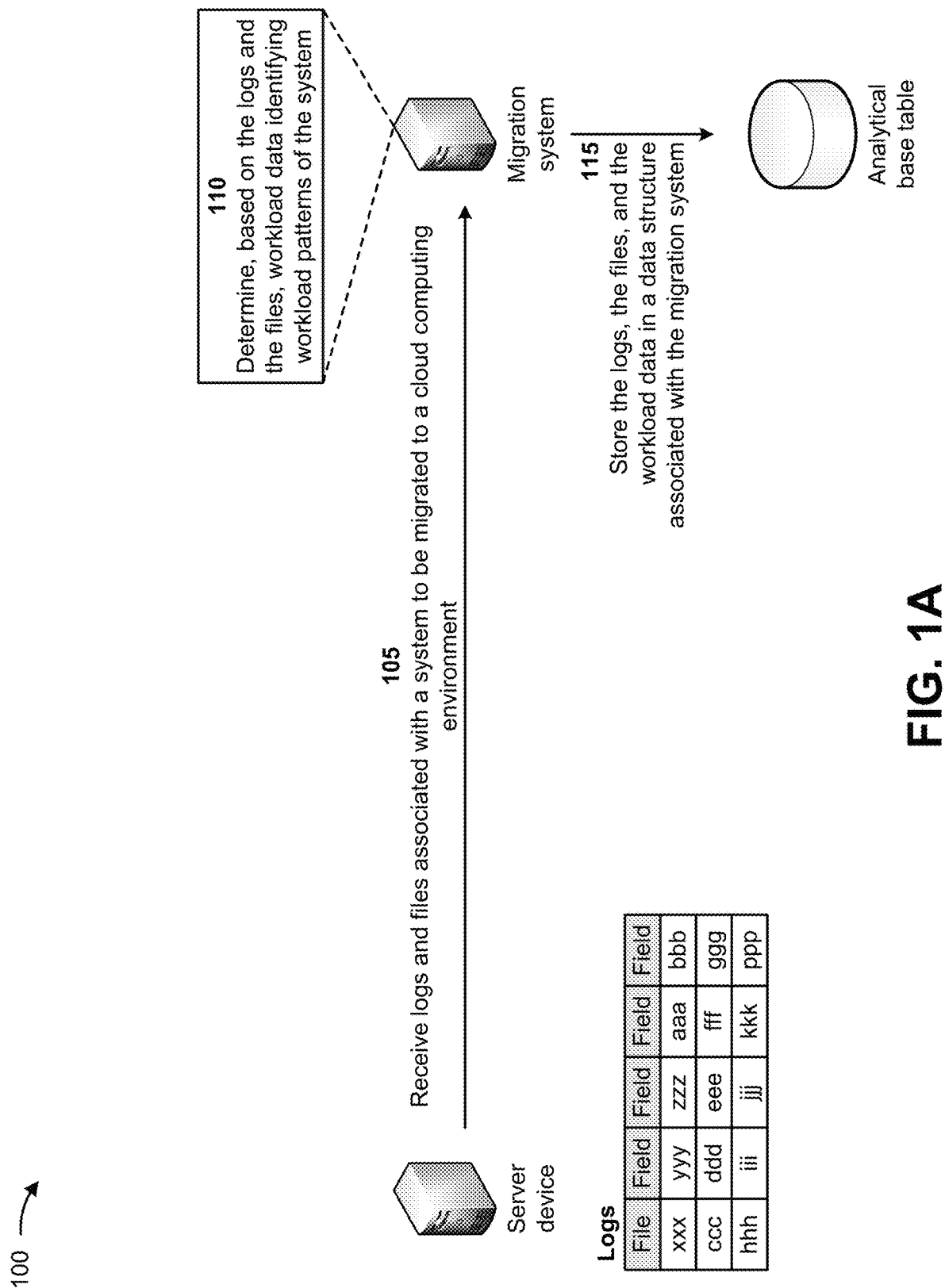

The following detailed description of example implementations refers to the accompanying drawings. The same reference numbers in different drawings may identify the same or similar elements.

Determining whether a system can be viably migrated to a cloud computing environment requires an assessment that is manually impossible to perform due to lack of transparency of usage by various users and unavailability of centralized repository where system artifacts are hosted. The system may have been executing for years, may have no centralized governance, and may include an outdated infrastructure with resources requiring various skillsets resulting in high capital and operational expenditures. Furthermore, comparing a cost of operating the system and a value delivered by the system may be impossible since the system may perform data processing rather than generate insights. The system may be difficult or impossible to monitor due to a distributed nature of the system, the lack of centralized governance, and system developers moving into different roles or jobs. Therefore, current techniques for assessing a system and/or migrating a system to a cloud computing environment consume computing resources (e.g., processing resources, memory resources, communication resources, and/or the like), networking resources, and/or the like associated with failing to properly assess whether the system can be viably migrated to a cloud computing environment, spending time and money and other resources on migration of a non-functional system to the cloud computing environment, attempting and failing to migrate the system to the cloud computing environment, and/or the like.

Some implementations described herein relate to a migration system that utilizes a machine learning model to migrate a system to a cloud computing environment. For example, the migration system may receive logs and files associated with a system to be migrated to a cloud computing environment, and may determine, based on the logs and the files, workload data identifying workload patterns of the system. The migration system may derive a data lineage for source data and target data included the logs and the files, and may assess a utilization pattern of the system based on the logs and the files to determine whether a distributed computing feature of the system is being utilized. The migration system may train a machine learning model with a training dataset to generate a trained machine learning model, and may process the workload data, the data lineage, and data identifying utilization of the distributed computing feature, with the trained machine learning model, to label utilization features of the system and to recommend a cloud architecture. The migration system may process the workload data, the data lineage, and the data identifying utilization of the distributed computing feature, with a natural language processing model, to determine a cost of migrating the system to the cloud computing environment. The migration system may process the labelled utilization features, the cloud architecture, and the cost, with a Q-matrix model, to determine migration actions for migrating the system to the cloud computing environment, and may perform one or more actions based on the migration actions.

In this way, the migration system utilizes a machine learning model to migrate a system to a cloud computing environment. The migration system may analyze artifacts of the system across dimensions, such as workload, complexity, lineage, consumption, utilization, and/or the like, and may generate insights into an overall utilization of the system, resource consumption by the system, penetration of the system within and across organizations, distribution of system workloads, and/or the like. The migration system may provide a detailed mapping of system constructs to system workload (e.g., data management, reporting, analytics, machine learning, and/or the like), and may determine an architecture for the cloud computing environment. The migration system may generate a roadmap for migrating the system to the cloud computing environment, and may migrate the system to the architecture of the cloud computing environment based on the roadmap. This, in turn, conserves computing resources, networking resources, and/or the like that would otherwise have been consumed in failing to accurately assess whether the system can be viably migrated to a cloud computing environment, spending time and money on migration of a non-functional system to the cloud computing environment, attempting and failing to migrate the system to the cloud computing environment, and/or the like.

FIGS. 1A-1H are diagrams of an example 100 associated with utilizing a machine learning model to migrate a system to a cloud computing environment. As shown in FIGS. 1A-1H, example 100 includes a migration system associated with a server device. The migration system may include a system that utilizes a machine learning model to migrate a system to a cloud computing environment. Further details of the migration system and the server device are provided elsewhere herein.

As shown in FIG. 1A, and by reference number 105, the migration system may receive logs and files associated with a system to be migrated to a cloud computing environment. For example, a system, such as a legacy SAS, may operate more efficiently in a cloud computing environment, may be terminated due to being obsolete, and/or the like. The migration system may determine whether the system may be migrated to a cloud computing environment and function correctly in the cloud computing environment. The migration system may receive the logs and the files associated with the system from one or more server devices executing the system, one or more data structures storing the system, and/or the like. In some implementations, the migration system may continuously receive the logs and the files from the server device, may periodically receive the logs and the files from the server device, may receive the logs and the files based on requesting the logs and the files from the server device, and/or the like.

The logs may include structured data, semi-structured data, and unstructured data associated with the system. In some implementations, the logs may include load sharing facility (LSF) logs, workspace server logs, store process logs, batch server logs, and/or the like. The files may include execution log files associated with the system. In some implementations, the files may include data identifying file names, file paths, execution times of the files, users of the files, and/or the like. In some implementations, the migration system may merge the logs and the files together based on path levels associated with the logs and the files.

As further shown in FIG. 1A, and by reference number 110, the migration system may determine, based on the logs and the files, workload data identifying workload patterns of the system. For example, when determining the workload data, the migration system may parse the logs and the files to identify procedures and functions performed by the system, and may determine the workload data identifying the workload patterns of the system based on the procedures and the functions performed by the system. In some implementations, the logs and the files may include names of the procedures and the functions performed by the system, and the migration system may parse the logs and the files to identify the names of the procedures and the functions performed by the system. The migration system may identify, in the parsed logs and the parsed files, workload patterns associated with the procedures and the function performed by the system, and may determine the workload data based on the workload patterns associated with the procedures and the function performed by the system.

As further shown in FIG. 1A, and by reference number 115, the migration system may store the logs, the files, and the workload data in a data structure associated with the migration system. For example, the migration system may maintain a data structure (e.g., a database, a table, a list, and/or the like), such as an analytical base table that stores semi-structured data and unstructured data (e.g., the logs and the files), structured data (e.g., the workload data) derived from the semi-structured data and the unstructured data, and/or the like. The migration system may utilize the analytical base table to determine a migration recommendation.

In some implementations, the migration system may store the logs, the files, and the workload data in the analytical base table.

Figure 1B:
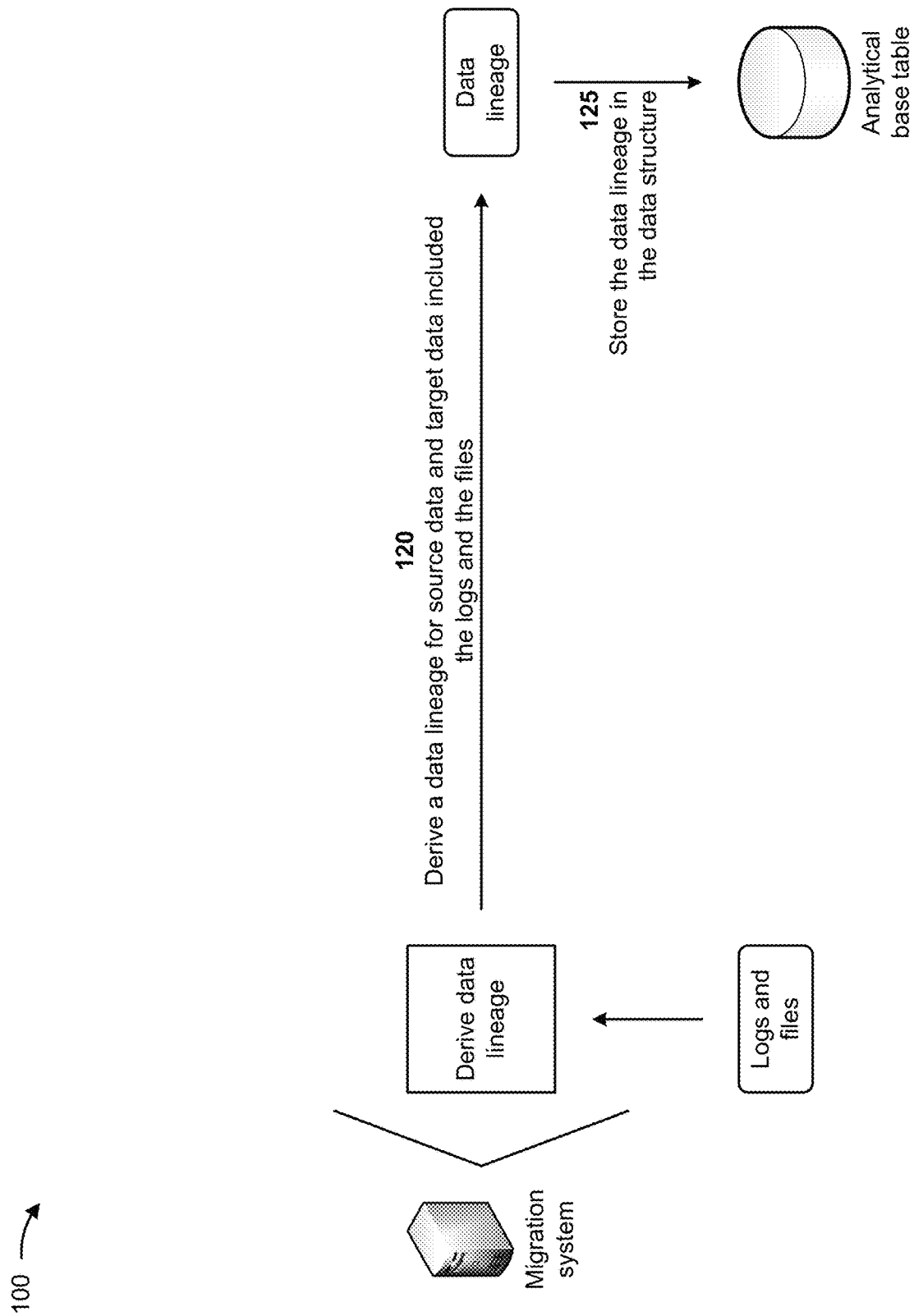

As shown in FIG. 1B, and by reference number 120, the migration system may derive a data lineage for source data and target data included the logs and the files. For example, when deriving the data lineage for the source data and the target data included the logs and the files, the migration system may parse the logs and the files to identify the source data and the target data, and may derive the data lineage based on the source data and the target data. In some implementations, the source data and the target data may be associated with an execution process of the system, and migration system may determine the data lineage based on the execution process of the system.

As further shown in FIG. 1B, and by reference number 125, the migration system may store the data lineage in the data structure. For example, the migration system may utilize the data structure (e.g., the analytical base table) to store structured data (e.g., the data lineage) derived from the semi-structured data and the unstructured data (e.g., the logs and the files). In some implementations, the migration system may store the data lineage in the analytical base table.

Figure 1C:
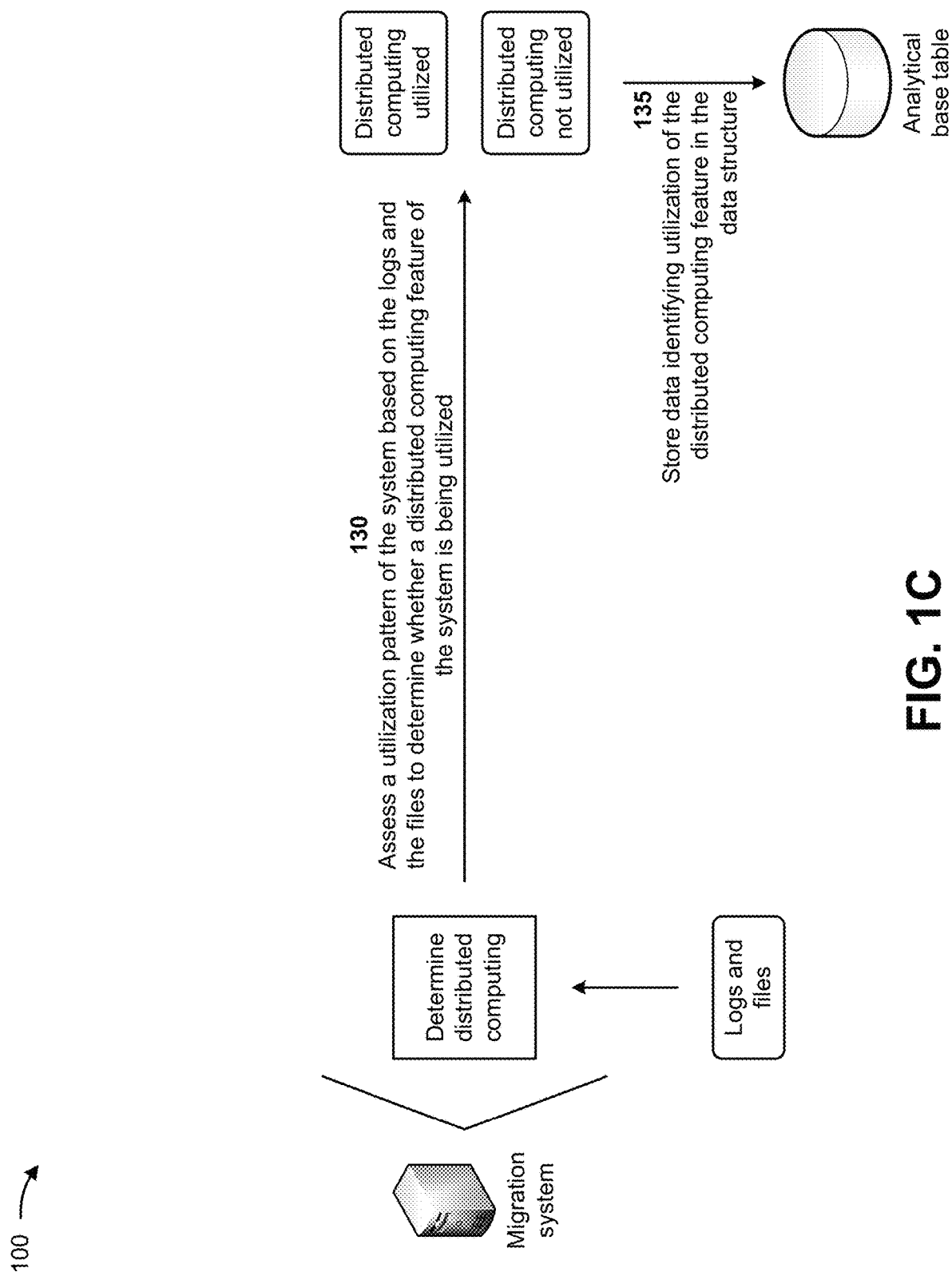

As shown in FIG. 1C, and by reference number 130, the migration system may assess a utilization pattern of the system based on the logs and the files to determine whether a distributed computing feature of the system is being utilized. For example, when assessing the utilization pattern of the system based on the logs and the files to determine whether the distributed computing feature of the system is being utilized, the migration system may parse the logs and the files to identify the utilization pattern of the system, and may determine whether the distributed computing feature of the system is being utilized based on the utilization pattern. In some implementations, the migration system may determine, based on the logs and the files, whether the system is optimally utilizing the distributed computing feature. The distributed computing feature may cause the system to distribute tasks among multiple computers on a network to enable workload balancing, accelerated processing, job scheduling, and/or the like.

As further shown in FIG. 1C, and by reference number 135, the migration system may store data identifying utilization of the distributed computing feature in the data structure. For example, the migration system may utilize the data structure (e.g., the analytical base table) to store structured data (e.g., the data identifying utilization of the distributed computing feature) derived from the semi-structured data and the unstructured data (e.g., the logs and the files). In some implementations, the migration system may store the data identifying utilization of the distributed computing feature in the analytical base table.

Figure 1D:
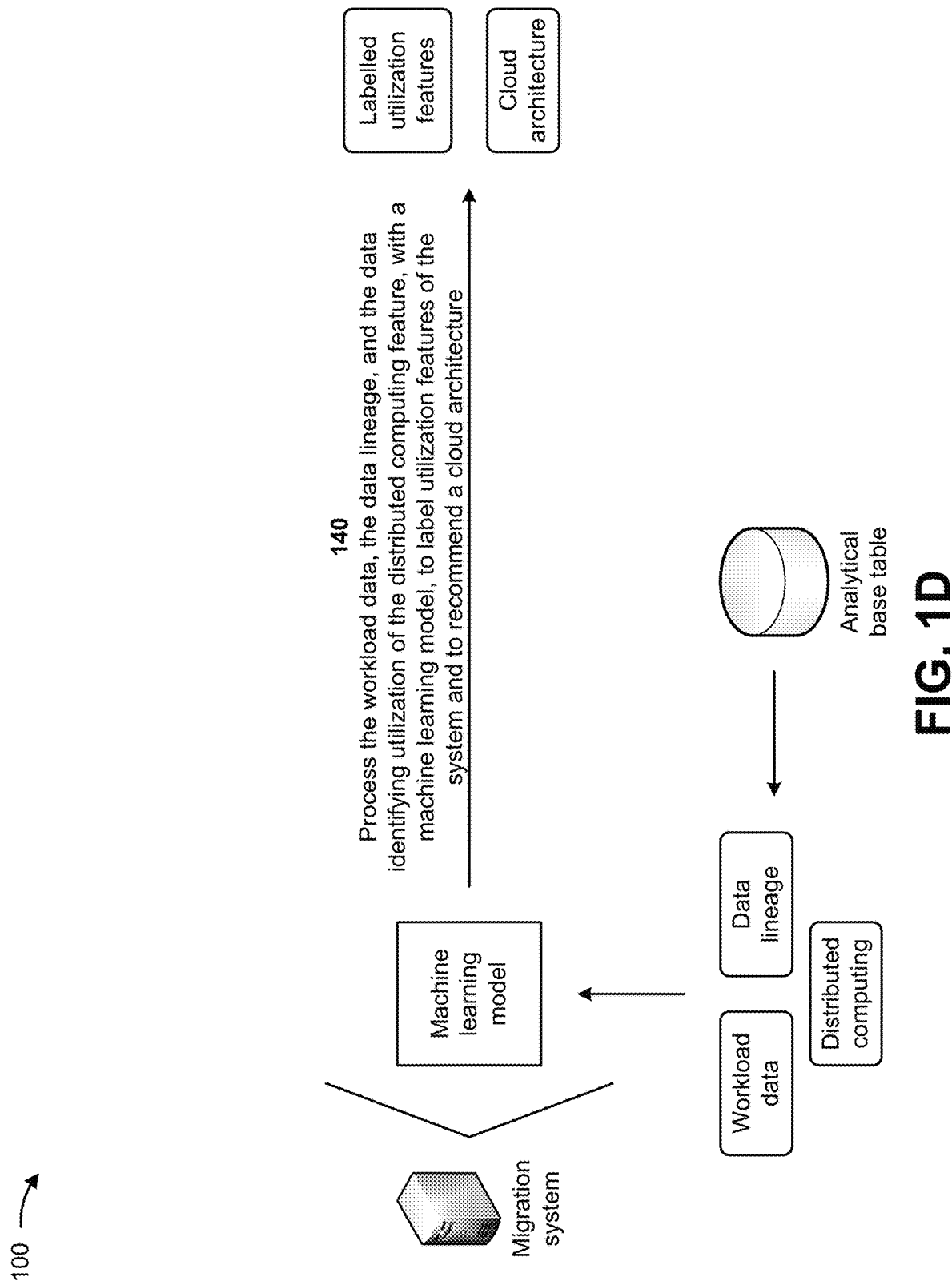

As shown in FIG. 1D, and by reference number 140, the migration system may process the workload data, the data lineage, and the data identifying utilization of the distributed computing feature, with a machine learning model, to label utilization features of the system and to recommend a cloud architecture. For example, the migration system may include a machine learning that automatically labels utilization features of the system (e.g., which may prevent logging shortcomings) and provides insights for a cloud architecture of the cloud computing environment. In some implementations, the migration system may train the machine learning model with a training dataset (e.g., to generate a trained machine learning model) and prior to processing the workload data, the data lineage, and data identifying utilization of the distributed computing feature with the machine learning model, and may test the machine learning model with a test dataset and prior to processing the workload data, the data lineage, and data identifying utilization of the distributed computing feature with the machine learning model. Further details of training and testing the machine learning model are provided below in connection with FIGS. 1E and 2. In some implementations, the migration system may process the workload data, the data lineage, and the data identifying utilization of the distributed computing feature, with the trained machine learning model, to label the utilization features of the system and to recommend the cloud architecture.

In some implementations, the machine learning model may include a linear regression model or a reinforcement model. A linear regression model may include a model that assumes a linear relationship between input variables (x) and a single output variable (y). More specifically, that the output variable can be calculated from a linear combination of the input variables. When there is a single input variable, the model is referred to as a simple linear regression model. When there are multiple input variables, the model is referred to as a multiple linear regression model. Different techniques can be used to prepare or train the linear regression model from data, such as ordinary least squares. A linear regression model prepared from ordinary least squares may be referred to as an ordinary least squares linear regression model or a least squares regression model. A reinforcement model may include a machine learning model associated with how intelligent agents ought to take actions in an environment in order to maximize a notion of a cumulative reward. A reinforcement model differs from a supervised learning model since the reinforcement model does not require labelled input/output pairs and does not require sub-optimal actions to be explicitly corrected. Instead, the reinforcement model attempts to identify a balance between exploration (of uncharted territory) and exploitation (of current knowledge).

Figure 1E:
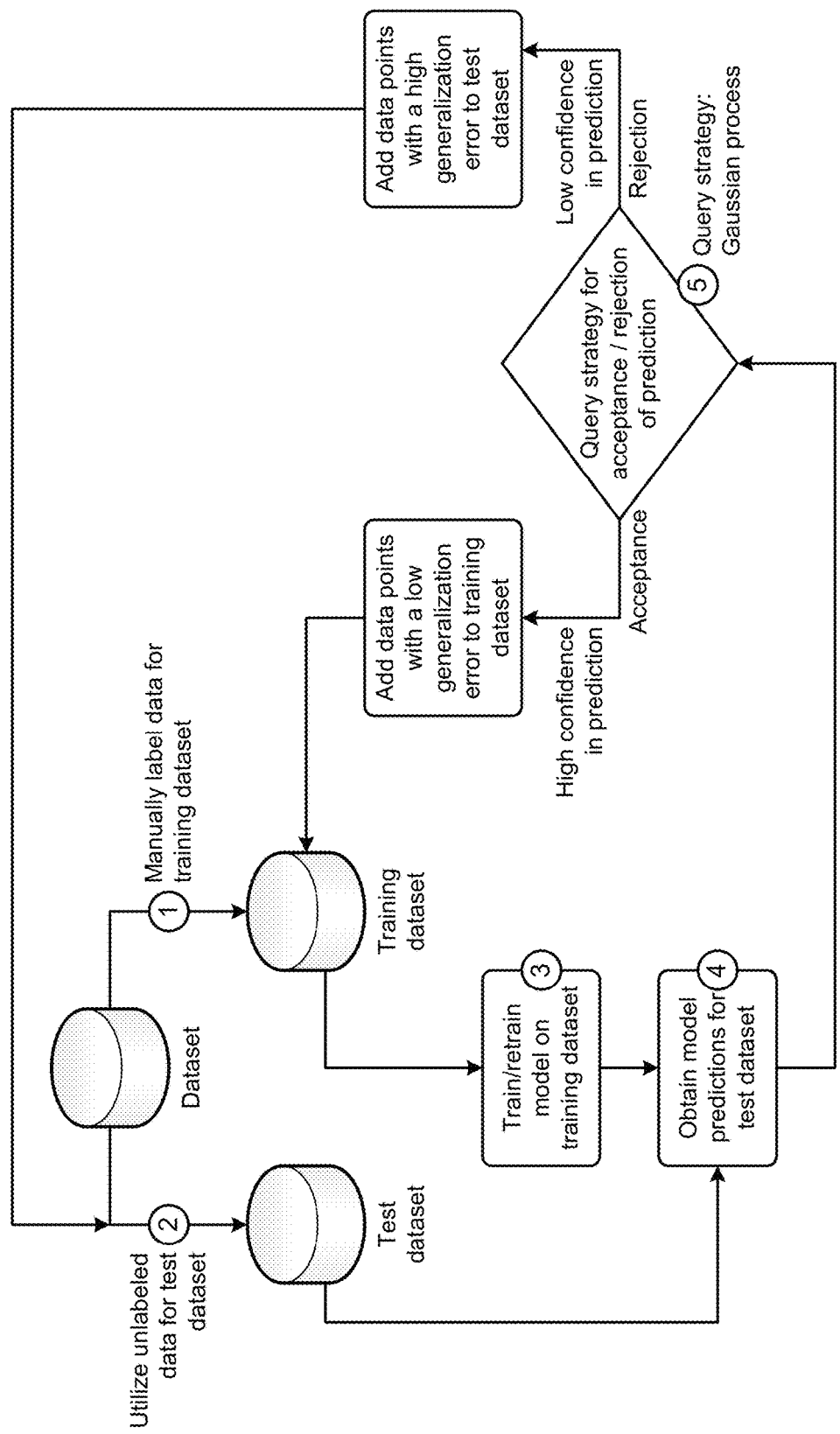

FIG. 1E depicts an example process of training the machine learning model to label utilization features of the system and to recommend a cloud architecture. Further details of training the machine learning model are provided below in connection with FIG. 2. As shown in FIG. 1E, the migration system may include a dataset (e.g., the analytical base table) that the migration system utilizes to generate a training dataset and a test dataset. As shown at step 1, the migration system may cause a portion of data from the dataset (e.g., less than five percent) to be labelled for the training dataset. A shown at step 2, the migration system may utilize the remaining data of the dataset (e.g., the unlabeled data) for the test dataset. As shown at step 3, the migration system may train and/or retrain the machine learning model based on the training dataset and to generate a trained machine learning model. As shown at step 4, the migration system may process the test dataset, with the trained machine learning model, to obtain predictions for the test dataset.

As shown at step 5 of FIG. 1E, the migration system may perform a query strategy for determining whether to accept or reject the predictions obtained for the test dataset. In some implementations, the query strategy may include a Gaussian process-based query strategy. The query strategy may accept predictions when the predictions have high confidence levels (e.g., low generalization errors), and may reject predictions when the predictions have low confidence levels (e.g., high generalization errors). The migration system may provide the accepted predictions to the training dataset, which may improve the training dataset and performance of the trained machine learning model. The migration system may provide the rejected predictions to the test dataset.

As shown in FIG. 1F, and by reference number 145, the migration system may process the workload data, the data lineage, and the data identifying utilization of the distributed computing feature, with a natural language processing model, to determine a cost of migrating the system to the cloud computing environment. For example, when processing the workload data, the data lineage, and the data identifying utilization of the distributed computing feature, with the natural language processing model, to determine the cost of migrating the system to the cloud computing environment, the migration system may identify products utilized by the system based on the workload data, the data lineage, and the data identifying utilization of the distributed computing feature. The migration system may generate a mapping of the products utilized by the system and products available in the cloud computing environment, and may determine the cost (e.g., a bill of material) of migrating the system to the cloud computing environment based on the mapping.

In some implementations, the migration system may utilize the natural language processing model to analyze the workload data, the data lineage, and the data identifying utilization of the distributed computing feature to identify the products utilized by the system, and to map the products utilized by the system with the products available in the cloud computing environment. The migration system may utilize the mapping of the products utilized by the system and the products available in the cloud computing environment to determine the cost of migrating the system to the cloud computing environment, recommendations for removal of unutilized products from the migration (e.g., which may reduce licensing costs), recommendations for addition of products for the migration, and/or the like.

Figure 1G:
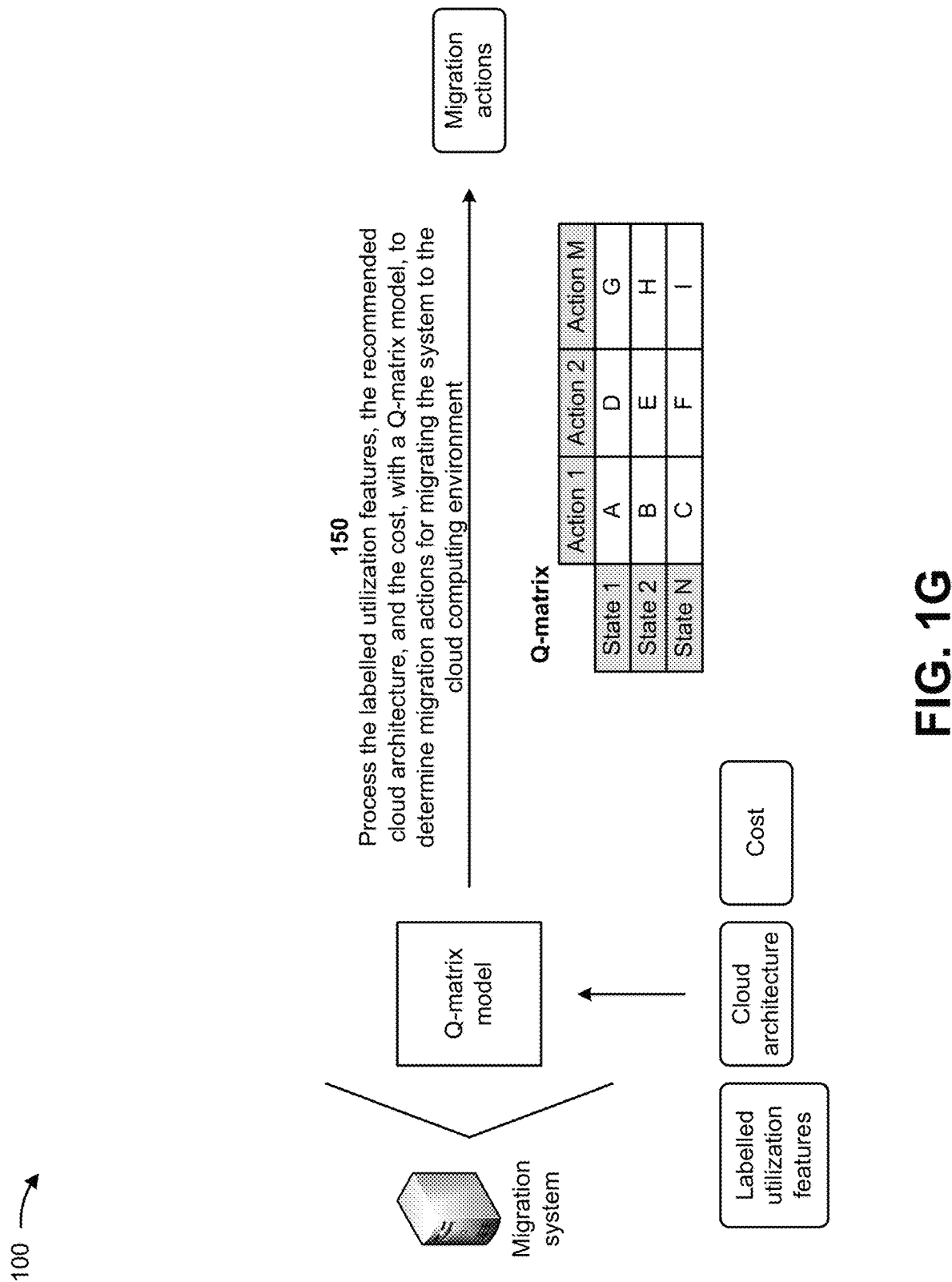

As shown in FIG. 1G, and by reference number 150, the migration system may process the labelled utilization features, the cloud architecture, and the cost, with a Q-matrix model, to determine migration actions for migrating the system to the cloud computing environment. For example, when processing the labelled utilization features, the cloud architecture, and the cost, with the Q-matrix model, to determine the migration actions, the migration system may assign complexity scores to the labelled utilization features (e.g., system files) based on the cloud architecture and the cost, and may assign actions based on the complexity scores assigned to the labelled utilization features. The migration system may create a reward matrix based on the complexity scores assigned to the labelled utilization features and based on the assigned actions. When creating the reward matrix, the migration system may create a bucket of a complexity range based on the complexity scores, may calculate weights for different steps in the migration process, and may create the reward matrix based transitions of the steps. The migration system may create, based on the reward matrix, a Q-matrix that maps the assigned actions and states.

When creating the Q-matrix, the migration system may map the assigned actions to migration actions, may create the Q-matrix with the mapping of the migration actions and the states, and may train the Q-matrix. The migration system may utilize the Q-matrix to determine the migration actions. A Q-matrix is a square matrix whose associated linear complementarity problem LCP(M, q) has a solution for every vector q.

Figure 1H:
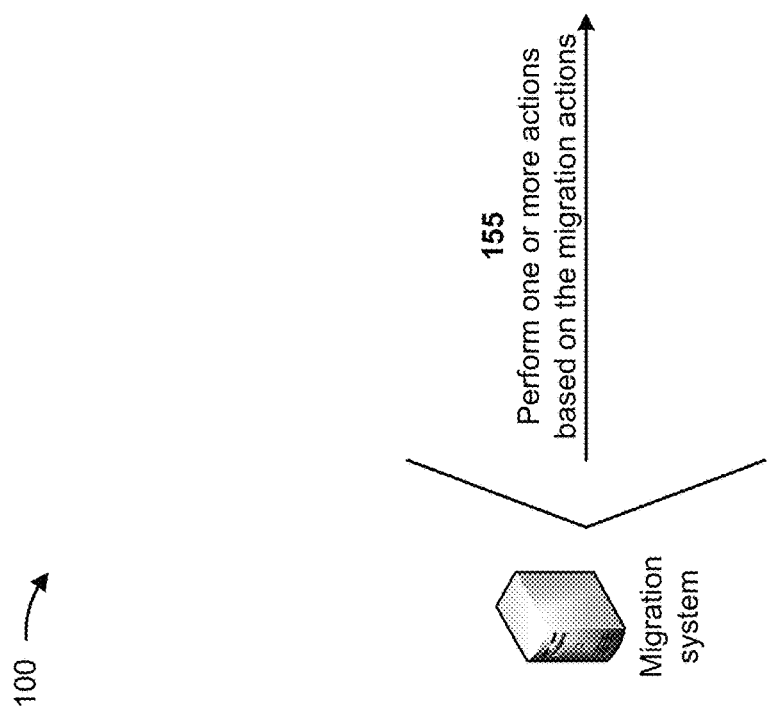

As shown in FIG. 1H, and by reference number 155, the migration system may perform one or more actions based on the migration actions. In some implementations, performing the one or more actions includes the migration system providing the migration actions for display. For example, the migration system may provide the migration actions for display to a user of the migration system. The user may then manage the migration actions based on the display. In this way, the migration system conserves computing resources, networking resources, and/or the like that would otherwise have been consumed in failing to accurately assess whether the system can be viably migrated to a cloud computing environment.

In some implementations, performing the one or more actions includes the migration system generating a sizing template based on the migration actions and creating an architecture for the cloud computing environment based on the sizing template. For example, the migration system may generate the sizing template based on the migration actions, the workload data, the data lineage, and the data identifying utilization of the distributed computing feature. The migration system may utilize the sizing template to create the architecture (e.g., a blueprint) for the cloud computing environment and data identifying integration with various external services, applications, databases, and/or the like. In this way, the migration system conserves computing resources, networking resources, and/or the like that would otherwise have been consumed in spending time and money on migration of a non-functional system to the cloud computing environment.

In some implementations, performing the one or more actions includes the migration system determining complexities associated with migrating the system based on the migration actions and generating a migration roadmap based on the complexities. For example, the migration system may populate a template with the determined complexities (e.g., determined by the Q-matrix model) associated with migrating the system, and may utilize the template to identify inventor and effort estimates and to generate the migration roadmap, a team construct, and a timeline migrating the system to the cloud computing environment. In this way, the migration system conserves computing resources, networking resources, and/or the like that would otherwise have been consumed in attempting and failing to migrate the system to the cloud computing environment.

In some implementations, performing the one or more actions includes the migration system determining data groups of the system based on the migration actions and migrating data of the system to the cloud computing environment based on the data groups. For example, the migration system may determine the data groups of the system based on workload type, compatibility, dependencies, and/or the like associated with the data of the system. The migration system may automatically or semi-automatically migrate the data of the system to the cloud computing environment based the data groups, and may validate the migration of the data to the cloud computing environment. In this way, the migration system conserves computing resources, networking resources, and/or the like that would otherwise have been consumed in failing to accurately assess whether the system can be viably migrated to a cloud computing environment.

In some implementations, performing the one or more actions includes the migration system receiving a change to one of the migration actions and modifying the one of the migration actions based on the change. For example, the migration system may receive a change to one of the migration actions from a user of the migration system. The change may indicate that only a portion of a product of the system is to be migrated rather than the entire product. The migration system may update the migration action so that only the portion of the product is migrated during the migration of the system to the cloud computing environment. In this way, the migration system conserves computing resources, networking resources, and/or the like that would otherwise have been consumed in spending time and money on migration of a non-functional system to the cloud computing environment, attempting and failing to migrate the system to the cloud computing environment, and/or the like.

In some implementations, performing the one or more actions includes the migration system retraining the machine learning model based on the migration actions. For example, the migration system may utilize the migration actions as additional training data for retraining the machine learning model, thereby increasing the quantity of training data available for training the machine learning model. Accordingly, the migration system may conserve computing resources associated with identifying, obtaining, and/or generating historical data for training the machine learning model relative to other systems for identifying, obtaining, and/or generating historical data for training machine learning models.

In this way, the migration system utilizes a machine learning model to migrate a system to a cloud computing environment. The migration system may analyze artifacts of the system across dimensions, such as workload, complexity, lineage, consumption, utilization, and/or the like, and may generate insights into an overall utilization of the system, resource consumption by the system, penetration of the system within and across organizations, distribution of system workloads, and/or the like. The migration system may provide a detailed mapping of system constructs to system workload (e.g., data management, reporting, analytics, machine learning, and/or the like), and may determine an architecture for the cloud computing environment. The migration system may generate a roadmap for migrating the system to the cloud computing environment, and may migrate the system to the architecture of the cloud computing environment based on the roadmap. This, in turn, conserves computing resources, networking resources, and/or the like that would otherwise have been consumed in failing to accurately assess whether the system can be viably migrated to a cloud computing environment, spending time and money on migration of a non-functional system to the cloud computing environment, attempting and failing to migrate the system to the cloud computing environment, and/or the like. Furthermore, the migrations system may significantly reduce a time required (e.g., by three to four months) for planning a migration and migration a system to a cloud computing environment, and may significantly reduce (e.g., by more than ninety percent) a workload of an entity post migration and transition to the cloud computing environment.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
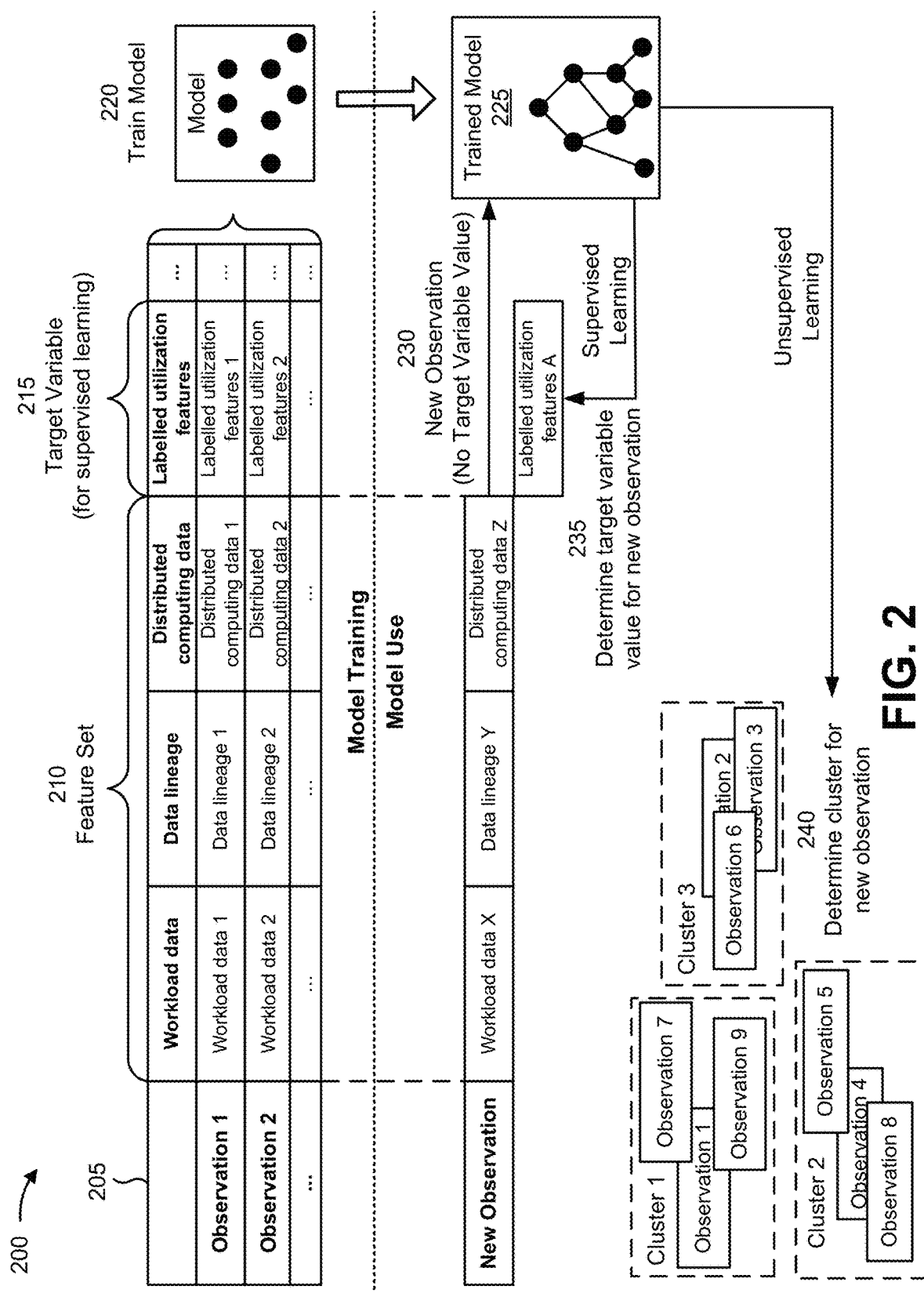
FIG. 2 is a diagram illustrating an example of training and using a machine learning model.

FIG. 2 is a diagram illustrating an example 200 of training and using a machine learning model for labeling utilization features of the system and recommending a cloud architecture. The machine learning model training and usage described herein may be performed using a machine learning system. The machine learning system may include or may be included in a computing device, a server, a cloud computing environment, and/or the like, such as the migration system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the migration system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the migration system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of workload data, a second feature of data lineage, a third feature of distributed computing data, and so on. As shown, for a first observation, the first feature may have a value of workload data 1, the second feature may have a value of data lineage 1, the third feature may have a value of distributed computing data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labelled utilization features and may include a value of labelled utilization features 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of workload data X, a second feature of data lineage Y, a third feature of distributed computing data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of labelled utilization features A for the target variable of the component for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a workload data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a data lineage cluster), then the machine learning system may provide a second (e.g., different) recommendation and/or may perform or cause performance of a second (e.g., different) automated action.

In some implementations, the recommendation and/or automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to label utilization features of the system and recommending a cloud architecture. The machine learning system enables recognition and/or identification of tens, hundreds, thousands, or millions of features and/or feature values for tens, hundreds, thousands, or millions of observations, thereby increasing accuracy and consistency and reducing delay associated with labeling utilization features of the system and recommending a cloud architecture relative to requiring computing resources to be allocated for tens, hundreds, or thousands of operators to manually label utilization features of the system and recommending a cloud architecture.

As indicated above, FIG. 2 is provided as an example. Other examples may differ from what is described in connection with FIG. 2.

Figure 3:
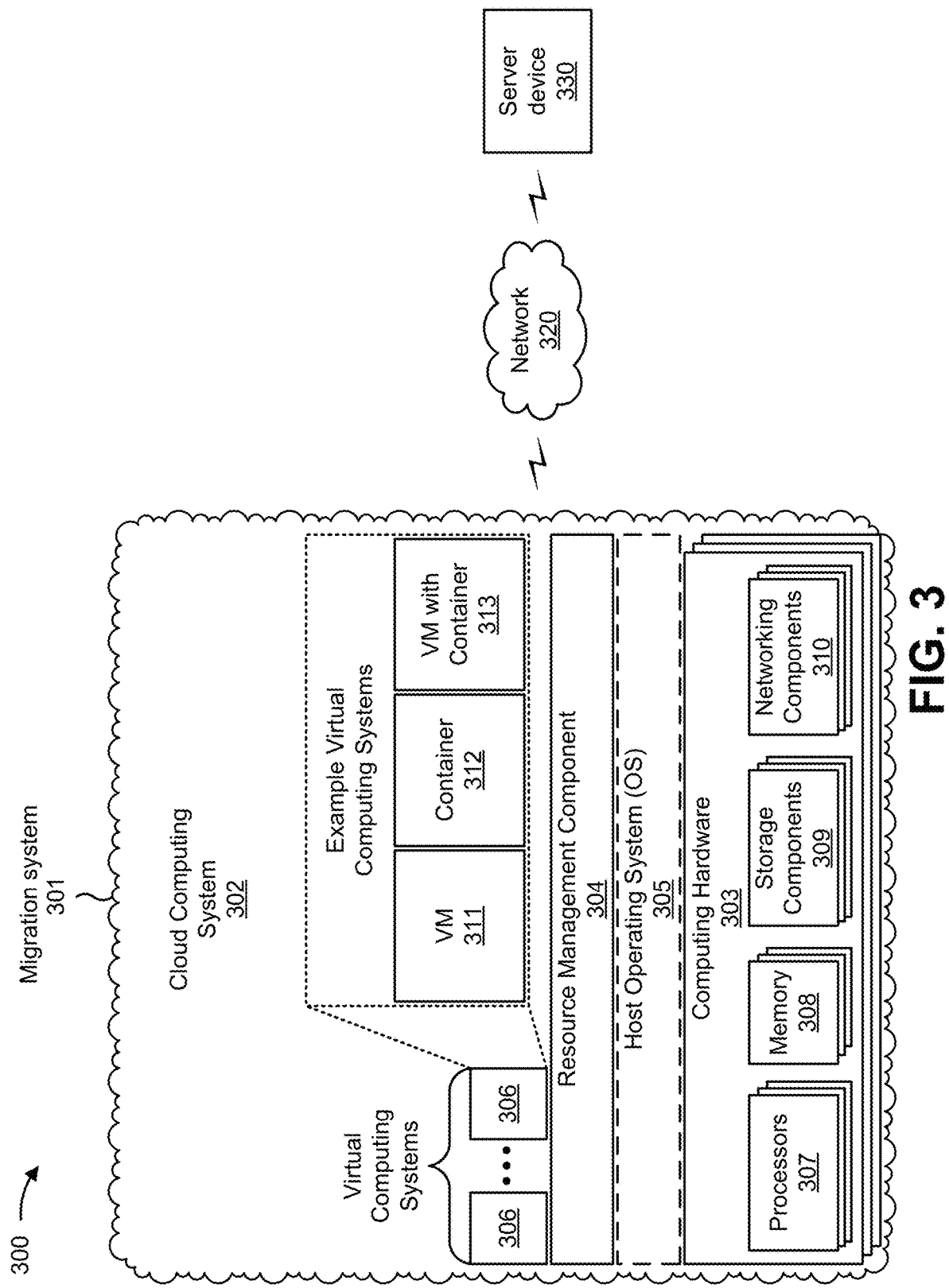
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a migration system 301, which may include one or more elements of and/or may execute within a cloud computing system 302. The cloud computing system 302 may include one or more elements 303-313, as described in more detail below. As further shown in FIG. 3, the environment 300 may include a network 320 and/or a server device 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/ or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the migration system 301 may include one or more elements 303-313 of the cloud computing system 302, may execute within the cloud computing system 302, and/or may be hosted within the cloud computing system 302, in some implementations, the migration system 301 may not be cloud-based (e.g., may be implemented outside of a cloud computing system) or may be partially cloud-based. For example, the migration system 301 may include one or more devices that are not part of the cloud computing system 302, such as device 400 of FIG. 4, which may include a standalone server or another type of computing device. The migration system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The server device 330 may include one or more devices capable of receiving, generating, storing, processing, providing, and/or routing information, as described elsewhere herein. The server device 330 may include a communication device and/or a computing device. For example, the server device 330 may include a server, such as an application server, a client server, a web server, a database server, a host server, a proxy server, a virtual server (e.g., executing on computing hardware), or a server in a cloud computing system. In some implementations, the server device 330 may include computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
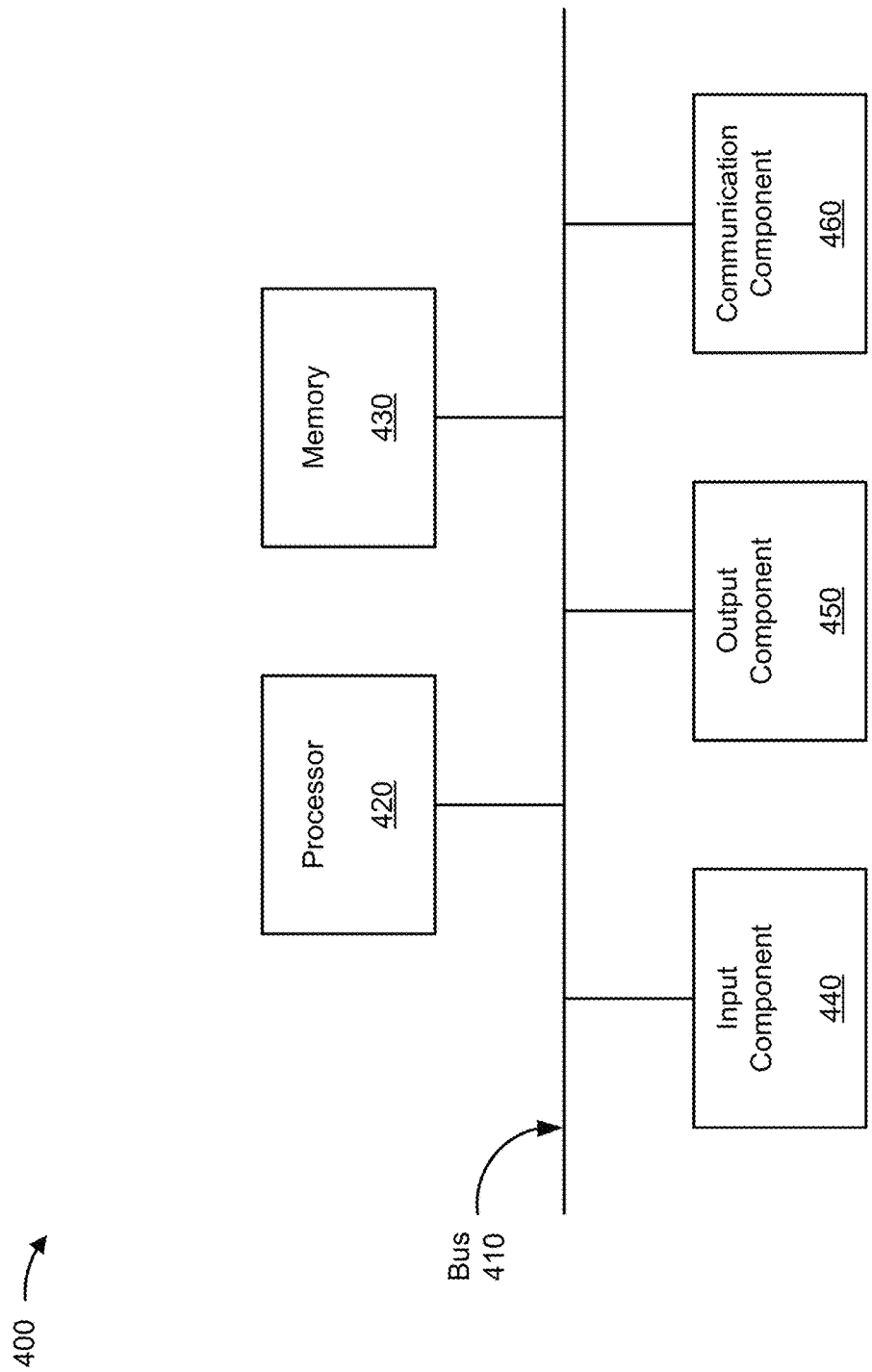
FIG. 4 is a diagram of example components of one or more devices of FIG. 3.

FIG. 4 is a diagram of example components of a device 400, which may correspond to the migration system 301 and/or the server device 330. In some implementations, the migration system 301 and/or the server device 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
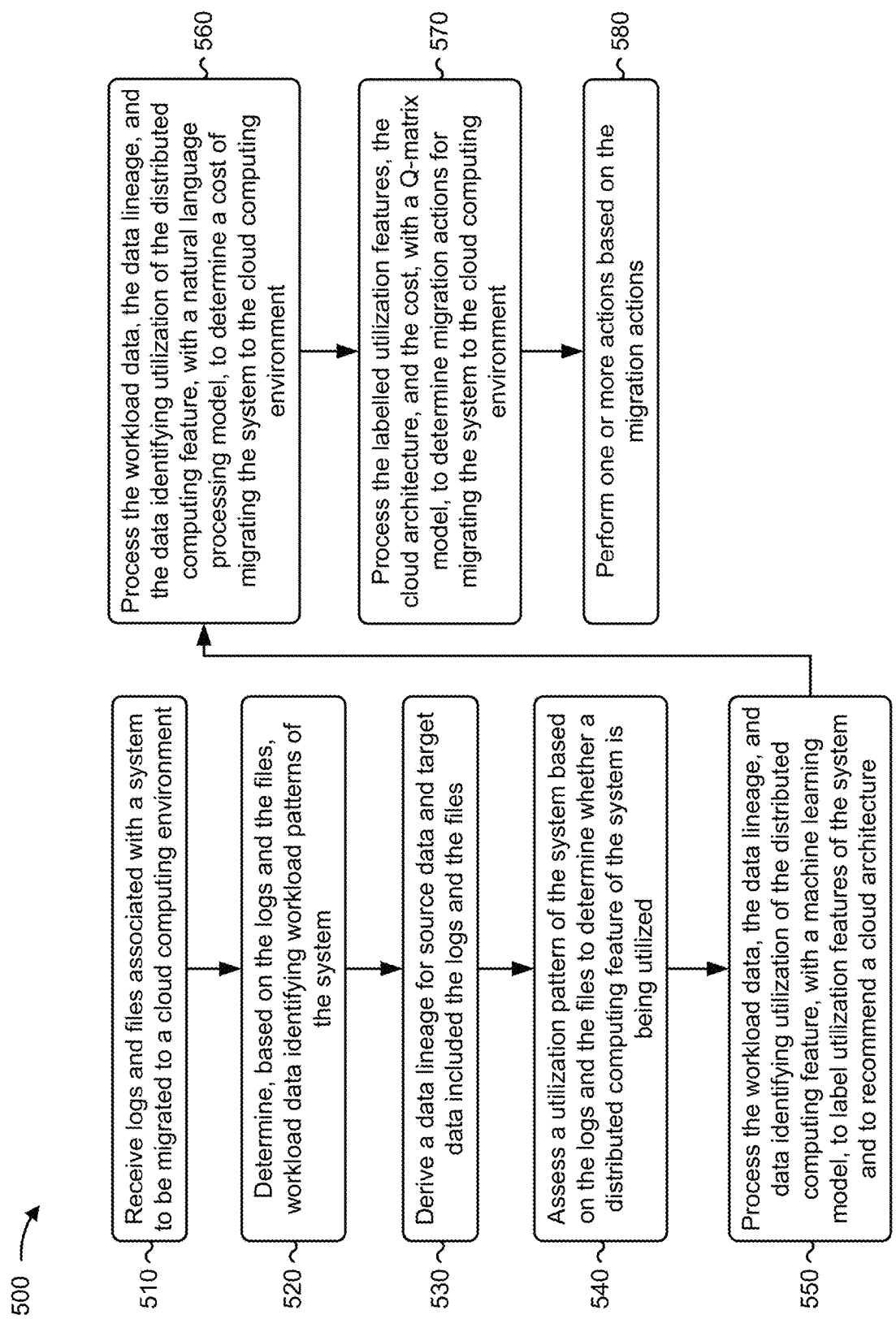
FIG. 5 is a flowchart of an example process for utilizing a machine learning model to migrate a system to a cloud computing environment.

FIG. 5 is a flowchart of an example process 500 for utilizing a machine learning model to migrate a system to a cloud computing environment. In some implementations, one or more process blocks of FIG. 5 may be performed by a device (e.g., the migration system 301). In some implementations, one or more process blocks of FIG. 5 may be performed by another device or a group of devices separate from or including the device, such as a server device (e.g., the server device 330). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving logs and files associated with a system to be migrated to a cloud computing environment (block 510). For example, the device may receive logs and files associated with a system to be migrated to a cloud computing environment, as described above. In some implementations, the logs include structured data, semi-structured data, and unstructured data associated with the system and the files include execution log files associated with the system.

As further shown in FIG. 5, process 500 may include determining, based on the logs and the files, workload data identifying workload patterns of the system (block 520). For example, the device may determine, based on the logs and the files, workload data identifying workload patterns of the system, as described above. In some implementations, determining, based on the logs and the files, the workload data identifying workload patterns of the system includes parsing the logs and the files to identify procedures and functions performed by the system, and determining the workload data based on the procedures and the functions performed by the system.

As further shown in FIG. 5, process 500 may include deriving a data lineage for source data and target data included the logs and the files (block 530). For example, the device may derive a data lineage for source data and target data included the logs and the files, as described above. In some implementations, deriving the data lineage for the source data and the target data included the logs and the files includes parsing the logs and the files to identify the source data and the target data, and deriving the data lineage based on the source data and the target data.

As further shown in FIG. 5, process 500 may include assessing a utilization pattern of the system based on the logs and the files to determine whether a distributed computing feature of the system is being utilized (block 540). For example, the device may assess a utilization pattern of the system based on the logs and the files to determine whether a distributed computing feature of the system is being utilized, as described above. In some implementations, assessing the utilization pattern of the system based on the logs and the files to determine whether the distributed computing feature of the system is being utilized includes parsing the logs and the files to identify the utilization pattern of the system, and determining whether the distributed computing feature of the system is being utilized based on the utilization pattern.

As further shown in FIG. 5, process 500 may include processing the workload data, the data lineage, and data identifying utilization of the distributed computing feature, with a machine learning model, to label utilization features of the system and to recommend a cloud architecture (block 550). For example, the device may process the workload data, the data lineage, and data identifying utilization of the distributed computing feature, with a machine learning model, to label utilization features of the system and to recommend a cloud architecture, as described above. In some implementations, the machine learning model is a linear regression model or a reinforcement model.

As further shown in FIG. 5, process 500 may include processing the workload data, the data lineage, and the data identifying utilization of the distributed computing feature, with a natural language processing model, to determine a cost of migrating the system to the cloud computing environment (block 560). For example, the device may process the workload data, the data lineage, and the data identifying utilization of the distributed computing feature, with a natural language processing model, to determine a cost of migrating the system to the cloud computing environment, as described above. In some implementations, processing the workload data, the data lineage, and the data identifying utilization of the distributed computing feature, with the natural language processing model, to determine the cost of migrating the system to the cloud computing environment includes identifying products utilized by the system based on the workload data, the data lineage, and the data identifying utilization of the distributed computing feature; generating a mapping of the products utilized by the system and products available in the cloud computing environment; and determining the cost of migrating the system to the cloud computing environment based on the mapping.

As further shown in FIG. 5, process 500 may include processing the labelled utilization features, the cloud architecture, and the cost, with a Q-matrix model, to determine migration actions for migrating the system to the cloud computing environment (block 570). For example, the device may process the labelled utilization features, the cloud architecture, and the cost, with a Q-matrix model, to determine migration actions for migrating the system to the cloud computing environment, as described above. In some implementations, processing the labelled utilization features, the cloud architecture, and the cost, with the Q-matrix model, to determine the migration actions includes assigning complexity scores to the labelled utilization features based on the cloud architecture and the cost; creating a reward matrix based on the complexity scores assigned to the labelled utilization features; creating, based on the reward matrix, a Q-matrix that maps actions and states; and determining the migration actions based on the Q-matrix.

As further shown in FIG. 5, process 500 may include performing one or more actions based on the migration actions (block 580). For example, the device may perform one or more actions based on the migration actions, as described above. In some implementations, performing the one or more actions includes providing the migration actions for display, receiving a change to one of the migration actions and modifying the one of the migration actions based on the change, or retraining the machine learning model based on the migration actions. In some implementations, performing the one or more actions includes generating a sizing template based on the migration actions, and creating an architecture for the cloud computing environment based on the sizing template. In some implementations, performing the one or more actions includes determining complexities associated with migrating the system based on the migration actions and generating a migration roadmap based on the complexities, or determining data groups of the system based on the migration actions and migrating data of the system to the cloud computing environment based on the data groups.

In some implementations, process 500 includes storing, in a data structure associated with the device, the logs, the files, the workload data, the data lineage, and the data identifying utilization of the distributed computing feature.

In some implementations, process 500 includes training the machine learning model with a training dataset and prior to processing the workload data, the data lineage, and data identifying utilization of the distributed computing feature with the machine learning model, and testing the machine learning model with a test dataset and prior to processing the workload data, the data lineage, and data identifying utilization of the distributed computing feature with the machine learning model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, logs and files associated with a system to be migrated to a cloud computing environment;
   determining, by the device and based on the logs and the files, workload data identifying workload patterns of the system;
   deriving, by the device, a data lineage for source data and target data included in the logs and the files,
      wherein deriving the data lineage comprises deriving particular structured data from particular semi-structured and particular unstructured data using the logs and the files, and
      wherein the logs include structured data, semi-structured data, and unstructured data associated with the system and the files include execution log files associated with the system;
   assessing, by the device, a utilization pattern of the system based on the logs and the files;
   determining whether a distributed computing feature of the system is being utilized based on the utilization pattern of the system, wherein determining whether the distributed computing feature of the system is being utilized comprises determining whether the system optimally distributes tasks among multiple computers on a network to enable workload balancing of the system;
   processing, by the device, the workload data, the data lineage, and data identifying utilization of the distributed computing feature, with a machine learning model, to label utilization features of the system and to recommend a cloud architecture;
   processing, by the device, the workload data, the data lineage, and the data identifying utilization of the distributed computing feature, with a natural language processing model, to determine a cost of migrating the system to the cloud computing environment;
   processing, by the device, the labelled utilization features, the cloud architecture, and the cost, with a Q-matrix model, to determine migration actions for migrating the system to the cloud computing environment,
      wherein the machine learning model is trained based on:
         portioning a dataset into a training dataset and a test dataset,
         training the machine learning model based on the training dataset,
         performing a query strategy for determining whether to accept or reject predictions obtained for the test dataset,
         accepting a subset of predictions, of the predictions, associated with confidence levels of a particular threshold, and
         retraining the machine learning model based on the accepted predictions; and performing, by the device, one or more actions based on the migration actions.

2. The method of claim 1, further comprising:
storing, in a data structure associated with the device, the logs, the files, the workload data, the data lineage, and the data identifying utilization of the distributed computing feature.

3. The method of claim 1, wherein determining, based on the logs and the files, the workload data identifying workload patterns of the system comprises:
parsing the logs and the files to identify procedures and functions performed by the system; and
determining the workload data based on the procedures and the functions performed by the system.

4. The method of claim 1, wherein deriving the data lineage for the source data and the target data included in the logs and the files comprises:
parsing the logs and the files to identify the source data and the target data; and
deriving the data lineage based on the source data and the target data.

5. The method of claim 1, wherein assessing the utilization pattern of the system based on the logs and the files to determine whether the distributed computing feature of the system is being utilized comprises:
parsing the logs and the files to identify the utilization pattern of the system.

6. The method of claim 1, further comprising:
training the machine learning model with the training dataset and prior to processing the workload data, the data lineage, and the data identifying utilization of the distributed computing feature with the machine learning model; and
testing the machine learning model with the test dataset and prior to processing the workload data, the data lineage, and the data identifying utilization of the distributed computing feature with the machine learning model.

7. A device, comprising:
one or more memories; and
one or more processors, coupled to the one or more memories, configured to:
receive logs and files associated with a system to be migrated to a cloud computing environment;
determine, based on the logs and the files, workload data identifying workload patterns of the system;
derive a data lineage for source data and target data included in the logs and the files,
wherein the one or more processors, to derive the data lineage, are configured to derive particular structured data from particular semi-structured and particular unstructured data using the logs and the files;
assess a utilization pattern of the system based on the logs and the files;
determine whether a distributed computing feature of the system is being utilized based on the utilization pattern of the system, wherein determining whether the distributed computing feature of the system is being utilized comprises determining whether the system optimally distributes tasks among multiple computers on a network to enable workload balancing of the system;
train a machine learning model with a training dataset to generate a trained machine learning model;
process the workload data, the data lineage, and data identifying utilization of the distributed computing feature, with the trained machine learning model, to label utilization features of the system and to recommend a cloud architecture,
wherein the machine learning model is trained based on:
portioning a dataset into a training dataset and a test dataset,
training the machine learning model based on the training dataset,
performing a query strategy for determining whether to accept or reject predictions obtained for the test dataset,
accepting a subset of predictions, of the predictions, associated with confidence levels of a particular threshold, and
retraining the machine learning model based on the accepted predictions;
process the workload data, the data lineage, and the data identifying utilization of the distributed computing feature, with a natural language processing model, to determine a cost of migrating the system to the cloud computing environment;
process the labelled utilization features, the cloud architecture, and the cost, with a Q-matrix model, to determine migration actions for migrating the system to the cloud computing environment; and
perform one or more actions based on the migration actions,
wherein the one or more processors, to process the labelled utilization features, the cloud architecture, and the cost, with the Q-matrix model, to determine the migration actions, are configured to:
assign complexity scores to the labelled utilization features based on the cloud architecture and the cost;
create a reward matrix based on the complexity scores assigned to the labelled utilization features;
create, based on the reward matrix, a Q-matrix that maps actions and states; and determine the migration actions based on the Q-matrix.

8. The device of claim 7, wherein the machine learning model is a linear regression model or a reinforcement model.

9. The device of claim 7, wherein the one or more processors, to process the workload data, the data lineage, and the data identifying utilization of the distributed computing feature, with the natural language processing model, to determine the cost of migrating the system to the cloud computing environment, are configured to:
identify products utilized by the system based on the workload data, the data lineage, and the data identifying utilization of the distributed computing feature;
generate a mapping of the products utilized by the system and products available in the cloud computing environment; and
determine the cost of migrating the system to the cloud computing environment based on the mapping.

10. The device of claim 7, wherein the one or more processors, to perform the one or more actions, are configured to one or more of:
provide the migration actions for display;
receive a change to one of the migration actions and modify the one of the migration actions based on the change; or
retrain the machine learning model based on the migration actions.

11. The device of claim 7, wherein the one or more processors, to perform the one or more actions, are configured to:

generate a sizing template based on the migration actions; and create an architecture for the cloud computing environment based on the sizing template.

12. The device of claim 7, wherein the one or more processors, to perform the one or more actions, are configured to one or more of:

determine complexities associated with migrating the system based on the migration actions and generate a migration roadmap based on the complexities; or determine data groups of the system based on the migration actions and migrate data of the system to the cloud computing environment based on the data groups.

13. A non-transitory computer-readable medium storing a set of instructions, the set of instructions comprising:

one or more instructions that, when executed by one or more processors of a device, cause the device to:

determine, based on logs and files associated with a system to be migrated to a cloud computing environment, workload data identifying workload patterns of the system;

derive a data lineage for source data and target data included in the logs and the files,
wherein the one or more instructions, that cause the device to derive the data lineage, cause the device to derive particular structured data from particular semi-structured and particular unstructured data using the logs and the files;

assess a utilization pattern of the system based on the logs and the files;

determine whether a distributed computing feature of the system is being utilized based on the utilization pattern of the system, wherein determining whether the distributed computing feature of the system is being utilized comprises determining whether the system optimally distributes tasks among multiple computers on a network to enable workload balancing of the system;

process the workload data, the data lineage, and data identifying utilization of the distributed computing feature, with a machine learning model, to label utilization features of the system and to recommend a cloud architecture,
wherein the machine learning model is trained based on:
portioning a dataset into a training dataset and a test dataset,
training the machine learning model based on the training dataset, performing a query strategy for determining whether to accept or reject predictions obtained for the test dataset,
accepting a subset of predictions, of the predictions, associated with confidence levels of a particular threshold, and
retraining the machine learning model based on the accepted predictions;

process the workload data, the data lineage, and the data identifying utilization of the distributed computing feature, with a natural language processing model, to determine a cost of migrating the system to the cloud computing environment;

process the labelled utilization features, the cloud architecture, and the cost, with a Q-matrix model, to determine migration actions for migrating the system to the cloud computing environment; and perform one or more actions based on the migration actions,
wherein the one or more instructions, that cause the device to process the labelled utilization features, the cloud architecture, and the cost, with the Q-matrix model, to determine the migration actions, cause the device to:
assign complexity scores to the labelled utilization features based on the cloud architecture and the cost;
create a reward matrix based on the complexity scores assigned to the labelled utilization features;
create, based on the reward matrix, a Q-matrix that maps actions and states; and
determine the migration actions based on the Q-matrix.

14. The non-transitory computer-readable medium of claim 13, wherein the one or more instructions further cause the device to:

train the machine learning model with the training dataset and prior to processing the workload data, the data lineage, and the data identifying utilization of the distributed computing feature with the machine learning model; and test the machine learning model with the test dataset and prior to processing the workload data, the data lineage, and the data identifying utilization of the distributed computing feature with the machine learning model.

15. The non-transitory computer-readable medium of claim 13, wherein the one or more instructions, that cause the device to process the workload data, the data lineage, and the data identifying utilization of the distributed computing feature, with the natural language processing model, to determine the cost of migrating the system to the cloud computing environment, cause the device to:

identify products utilized by the system based on the workload data, the data lineage, and the data identifying utilization of the distributed computing feature;

generate a mapping of the products utilized by the system and products available in the cloud computing environment; and determine the cost of migrating the system to the cloud computing environment based on the mapping.

16. The non-transitory computer-readable medium of claim 13, wherein the one or more instructions, that cause the device to perform the one or more actions, cause the device to one or more of:

provide the migration actions for display;

receive a change to one of the migration actions and modify the one of the migration actions based on the change; or retrain the machine learning model based on the migration actions.

17. The non-transitory computer-readable medium of claim 13, wherein the one or more instructions, that cause the device to perform the one or more actions, cause the device to one or more of:

generate a sizing template based on the migration actions and create an architecture for the cloud computing environment based on the sizing template;

determine complexities associated with migrating the system based on the migration actions and generate a migration roadmap based on the complexities; or determine data groups of the system based on the migration actions and migrate data of the system to the cloud computing environment based on the data groups.

* * * * *